United States Patent [19]

Koyanagi

[11] Patent Number: 4,535,402
[45] Date of Patent: Aug. 13, 1985

[54] DIGITAL CONTROL METHOD
[75] Inventor: Yuzo Koyanagi, Warabi, Japan
[73] Assignee: Sanwa Seiki Mfg. Co., Ltd., Saitama, Japan
[21] Appl. No.: 332,010
[22] Filed: Dec. 18, 1981
[30] Foreign Application Priority Data Dec. 27, 1980 [JP] Japan .................. 55-189100
Dec. 27, 1980 [JP] Japan .................. 55-189104
Dec. 27, 1980 [JP] Japan .................. 55-189105

[51] Int. Cl.$^3$ .................................. G05B 15/02
[52] U.S. Cl. .................. 364/152; 364/183; 364/431.05; 123/500
[58] Field of Search ........... 364/183, 152, 153, 431.05; 123/500, 501

[56] References Cited

U.S. PATENT DOCUMENTS

| | | | |
|---|---|---|---|
| 3,584,203 | 6/1971 | Patzelt et al. | 364/183 |
| 3,914,581 | 10/1975 | Gilson | 364/183 |
| 4,217,862 | 8/1980 | Fort et al. | 123/501 |
| 4,235,374 | 11/1980 | Walter et al. | 123/500 |
| 4,455,867 | 6/1984 | Koyanagi | 73/119 A |

Primary Examiner—Jerry Smith
Assistant Examiner—Louis Woo
Attorney, Agent, or Firm—Henry Sternberg

[57] ABSTRACT

A digital control method for controlling a relative rotational phase angle $p\theta$ or the like in a fuel injection pump of an automobile. Decision is made of whether two successive deviations Er between the detected values and a target value are larger than a minimum reference deviation Ero or not. If they are larger than the Ero, decision is made of whether the signs of both the deviations are positive and/or negative. If both signs are positive, a given duration dTs is added to a fundamental duration ts of the next command signal for control. If both signs are different, a predetermined duration dTs is subtracted from the fundamental duration ts of the next command signal.

5 Claims, 12 Drawing Figures

DIGITAL CONTROL METHOD

This invention relates to a digital control method of controlling a relative rotational phase angle or the like in an automobile fuel injection pump.

The control sensitivity of the conventional closed loop control system is set to a constant value matched to the load in the control system since the load resistance and the external environment are not changed rapidly. However, in the control system in which the load resistance and the environment are greatly changed, the relative control sensitivity to the load resistance becomes too high or too low, to make the control unstable or the control response slow.

Thus, it is an object of the invention to provide a digital control method particularly capable of solving the above problems in the control system in which a considerable change occurs in the load resistance and environment.

According to the present invention, there is provided a method of digital control by use of a train of command signal pulses, which comprises the steps of (a) intermittently detecting the successive values of a parameter; (b) determining the deviation of each detected value from a target value of the parameter; (c) comparting the absolute value of each deviation with the absolute value of a predetermined minimum reference deviation; (d) if the absolute value of a determined deviation is less than the absolute value of said minimum reference deviation, setting the next command signal pulse to zero; (e) if the absolute value of a determined deviation is greater than the absolute value of said minimum reference deviation, determining the sign of the determined deviation and setting the duration of the next command signal pulse to a fundamental duration proportional to the determined deviation; (f) if the absolute values of a determined deviation and its next preceding determined deivation are both greater than the absolute value of said minimum reference deviation, determining the signs of the two successive deviations and, if both signs are the same, adding a given duration to the fundamental duration of the next command signal pulse or, if the signs are different, subtracting a predetermined duration from the fundamental duration of the next command signal pulse; and (g) outputting the next command signal pulse with a time lapse after each detection of the value of the parameter.

Other objects, features and advantages of the present invention will be more apparent from the following descriptions taken in conjunction with the accompanying drawings, in which.

Figure 1:
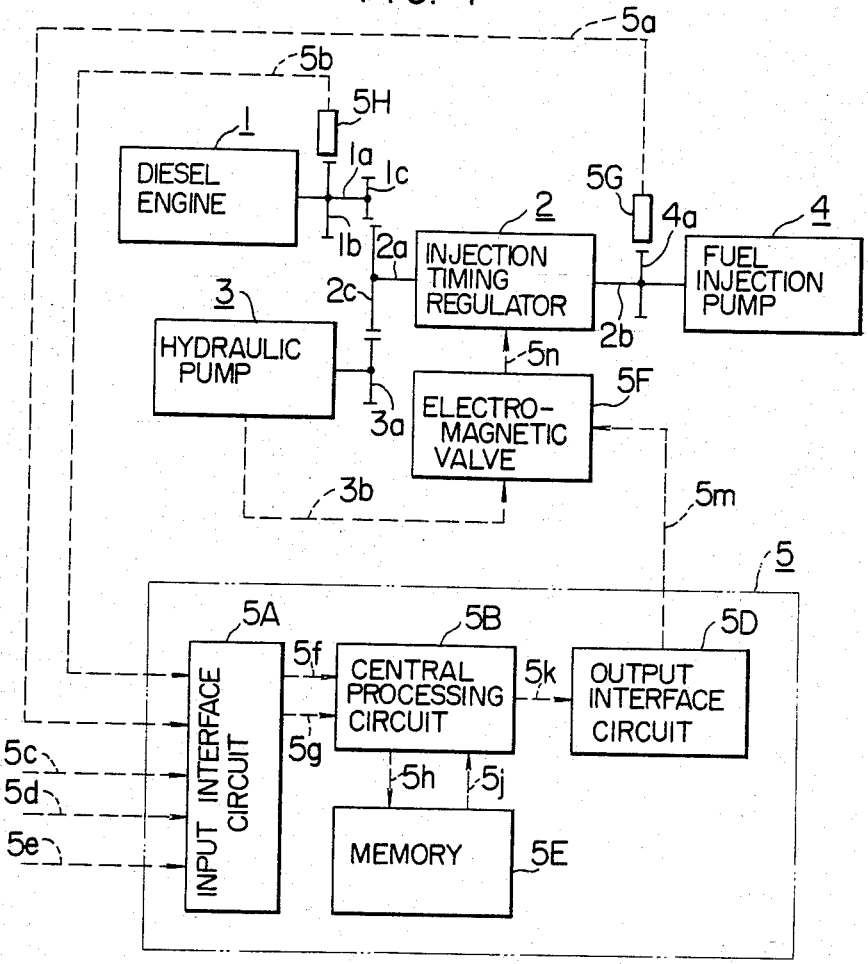
FIG. 1 is a block diagram of an arrangement in which the digital control method according to this invention is used for a fuel injection timing regulator of a diesel engine.

FIG. 1 is a systematic diagram of a digital control method of the present invention applied to the operation of an injection timing regulator 2 for a fuel injection pump 4 in a diesel engine 1. A pinion 1c provided on a crank shaft 1a of the diesel engine 1 is in engagement with a gear 2c provided on an input shaft 2a of the injection timing regulator 2, and an output shaft 2b of the injection timing regulator 2 is adapted to drive the fuel injection pump 4. The injection timing regulator 2 varies the rotational phase angle between the input shaft 2a and the output shaft 2b in response to the operational condition of the diesel engine 1 so as to appropriately adjust the injection timing for the fuel injection pump 4. The injection timing regulator 2 per se is known in the art.

A hydraulic pump 3 is driven through the gears 2c and 3a to supply a constant pressure to an electromagnetic valve 5F through a piping 3b.

The crank shaft 1a has a disk 1b, and the output shaft 2b also has a similar disk 4a, each with circumference thereof provided with a train of bosses disposed at a constant interval. Confronting the circumference of the disk 1b and 4a, there are fixedly provided electromagnetic pickups 5H and 5G, respectively, for detecting the rotation of the disks. Reference numbers 5a and 5b denote signal lines.

A signal line 5c transmits the displacement of the accelerator pedal for operating the diesel engine 1 to an input interface circuit 5A, a signal line 5d transmits the signal of the coolant temperature in the water jacket of the diesel engine 1 to the input interface circuit 5A, and a signal line 5e transmits the signal of the air temperature to the input interface circuit 5A.

The input interface circuit 5A, a central processing circuit 5B, a memory 5E and an output interface circuit 5D constitute a microcomputer 5. A signal line 5k is made up of one signal line 5k1 shown in FIG. 3 and another signal line which is not shown in the figure. The output of the microcomputer 5 is adapted to control the electromagnetic valve 5F through a signal line 5m, and the valve 5F operates the hydraulic actuator within the injection timing regulator 2 through a hydraulic pipe 5n.

Figure 2:
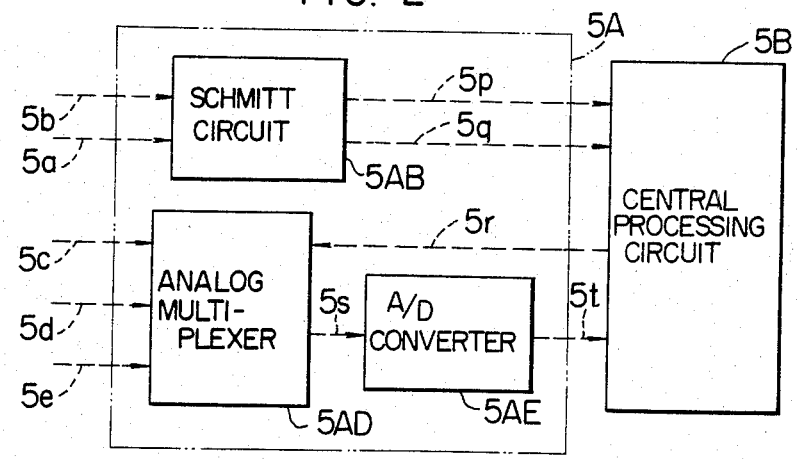
FIG. 2 is a block diagram of an input interface in FIG. 1.

The input interface circuit 5A consists of a Schmitt circuit 5AB, an analog multiplexer 5AD and an A/D converter 5AE as shown in FIG. 2, where reference numbers 5p, 5q, 5r, 5s, and 5t denote signal lines.

Figure 3:
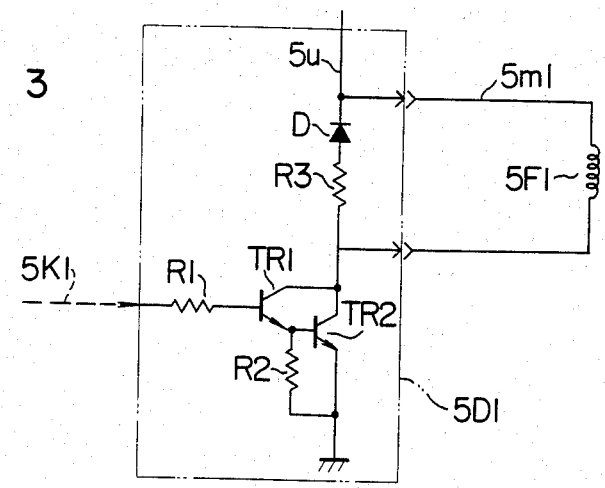
FIG. 3 is a circuit diagram of one output interface 5D1 in an output interfaces 5D in FIG. 1.

FIG. 3 shows an output interface circuit 5D1 which is one of circuits included in the output interface circuit 5D, where a resistor R1 has one end connected with the signal line 5k1 of the signal line 5k from the central processing circuit 5B. The signal line 5m1 is connected to a solenoid 5F1 of the electromagnetic valve 5F in FIG. 1, and a line 5u is connected to a stabilized power supply. The output interface circuit 5D1 further includes a fly-wheel diode D, resistors R2 and R3, and transistors TR1 and TR2. Another output interface circuit having another input line identical to the signal line 5k1 of the signal line 5k has the same circuit arrangement as that of FIG. 3, and a description and illustration thereof will, therefore, be omitted.

The operation of the system arrangement shown in FIGS. 1, 2 and 3 will now be described in the following. The diesel engine 1 operates in response to the displacement of the accelerator pedal (not shown in the figures). The fuel injection pump 4 is driven through the crank shaft 1a, the gears 1c and 2c, the input shaft 2a, the injection timing regulator 2, and its output shaft 2b. The injection timing regulator 2 is controlled depending on the rotational speed of the diesel engine 1, the displacement of the accelerator pedal, the temperature of the coolant in the water jacket (hereinafter called simply the coolant temperature), and the state of the air. By the oil pressure signal (control power) from the pipe 5n (plural), the oil pressure actuator within the injection timing regulator 2 is finally operated in one direction or in the other direction so that the injection timing regulator 2 changes the relative rotational phase angle (hereinafter, referred to simply as rotational phase) between the input shaft 2a (or corresponding to the crank shaft 1a) and the output shaft 2b. As a result, the injection timing of the fuel injection pump 4 is properly set.

In determining the timing of injection, the microcomputer 5 outputs a command signal to operate the electromagnetic valve 5F ON and OFF, and a powered hydraulic signal from the valve 5F operates the injection timing regulator 2. The operation of the microcomputer 5 which controls the electromagnetic valve 5F, i.e., a digital actuator, is described hereunder.

The displacement of the accelerator pedal, the coolant temperature and the air temperature are sensed in analog values by respective sensors (not shown in the drawings), and the sensed signals are subjected to the cyclic selection by an analog multiplexer 5AD in response to the signal from the central processing circuit 5B through a signal line 5r as shown in FIG. 2. The selected sensor signals in analog are transformed into digital values by an A/D converter 5AE, then delivered to the central processing circuit 5B.

Figure 6:
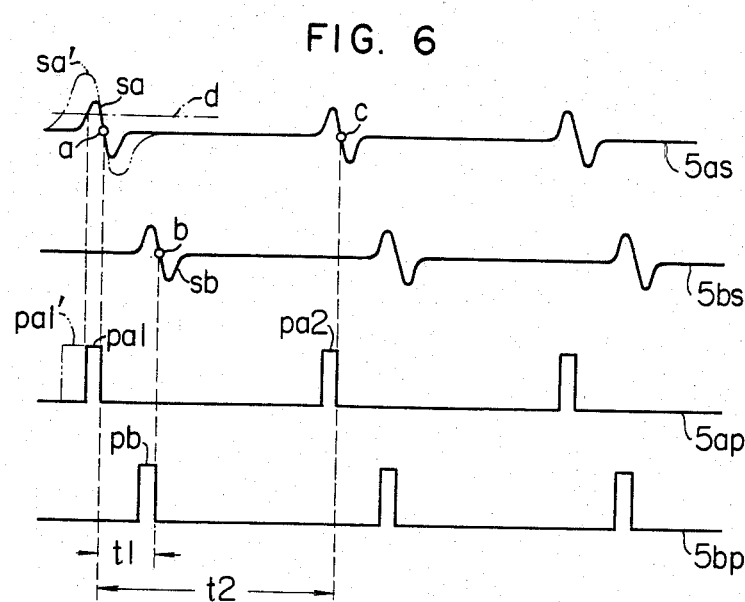
FIG. 6 is a waveform diagram of signals 5as and 5bs detected by electromagnetic pickups 5G and 5H in FIG. 1 and rectangular-shape signals 5ap and 5bp to which the signals 5as and 5bs are converted in a Schmitt circuit 54B in FIG. 2.

The rotational angle of the crank shaft 1a and the output shaft 2b is detected by the electromagnetic pick-ups 5H and 5G, respectively, to form detection signals 5as and 5bs as shown in FIG. 6, and these signals are supplied to the Schmitt circuit 5AB in FIG. 2. The horizontal axis of the chart in FIG. 6 represents time.

Pulse signals sa and sb in FIG. 6 show the pickup voltages when bosses on each of the disks 1b and 4a pass over each of the electromagnetic pickups 5H and 5G, respectively.

These pulse signals sa and sb are transformed into rectangular pulse signals pa1 and pb, respectively, by the Schmitt circuit 5AB (FIG. 2), then delivered to the central processing circuit 5B.

The pulse signals sa and sb vary their waveform as the rotational speed of the crank shaft 1a increases as shown by sa' in FIG. 6, causing the pulse signals pa1 and pb to vary with width in the time-axis direction as shown by pa1' since they are shaped basing on the reference voltage level d. However, zero crossing points a and b of the pulse signals sa and sb are scarcely affected by the rotational speed, and thus the reference points of the pulse signals pa1 and pb are defined on the basis of the points a and b, respectively.

Time intervals t1 and t2 represent passing times measured from the pulse signal pa1 to pb, and from pa1 to pa2. The rotational phase angle $P\theta$ between the input shaft 2a and the output shaft 2b, and the rotational speed n of the crank shaft 1a are expressed as follows.

$$P\theta = (c1 \times t1)/t2 \qquad (1)$$

$$n = c2/t2 \qquad (2)$$

where c1 and c2 are the constants determined from the number of bosses on the disks 1b and 4a, respectively.

The memory 5E in FIG. 1 stores various data necessary for the computation by the central processing circuit 5B.

The system is designed so that the fuel consumption can be minimized or the composition of exhaust gas can be optimized for the diesel engine 1 when the fuel injection timing is set to the ideal point depending on the coolant temperature, the air temperature, the displacement $\theta$ of the accelerator pedal, and the rotational speed n of the crank shaft 1a. Out of these functional relations, the memory 5E stores target rotational phase angles $p\theta o$ to be set to the injection timing regulator 2 in relation to the displacement $\theta$ of the accelerator pedal and the rotation speed n of the crank shaft 1a, for example, as shown by the memory map in FIG. 5.

Figure 5:
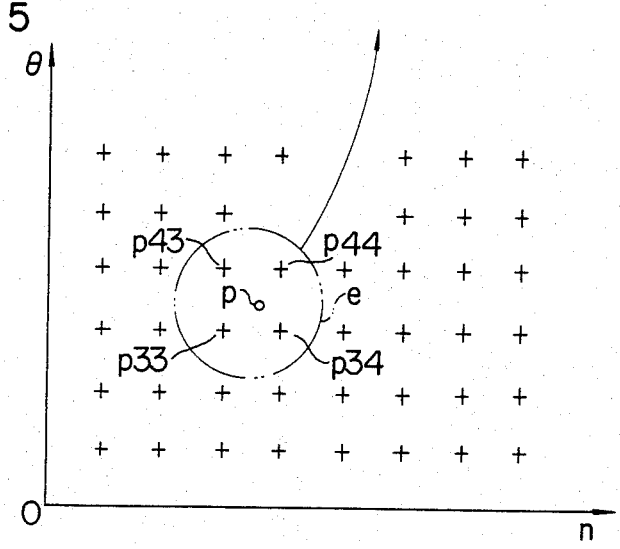
FIG. 5 is a digitally illustrated map of a target rotational phase angle of the fuel injection pump determined by the relation between the accelerator pedal $\theta$ and the engine rotational speed n.

In FIG. 5, each of marks "+" such as p33, p34, p43 and p44 represents a target rotational phase angle stored in correspondence to a pair of discrete values of the accelerator displacement $\theta$ and the crank shaft speed n taken at a constant interval, and several memory maps are stored for different coolant temperature and air temperature.

In FIG. 5, the target rotational phase angle $p\theta o$ at the actual operating point p, which is determined from the rotational speed n derived from the electromagnetic pickup 5H and the accelerator displacement $\theta$ at that time, is determined by reference rotational phase angles p33, p34, p43 and p44 in the neiborhood e of the point p.

Figure 4:
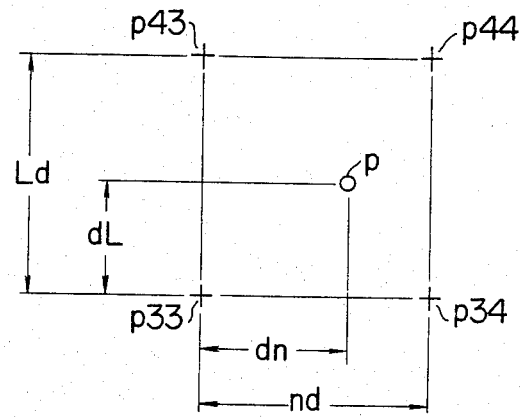
FIG. 4 is an enlarged diagram of an area e in FIG. 5.

FIG. 4 shows in detail the neiborhood e of the operating point p, where distances Ld and dL represent the difference of displacement of the accelerator pedal, and disstances nd and dn represent the difference of rotational speed. The target rotational phase angle $p\theta o$ at the point p is computed by the central processing circuit 5B in the following equations.

$$p\theta o = \{(A - B)dn/nd\} + B \qquad (3)$$

where $$A = \{(p44 - p34)dL/Ld\} + p34 \qquad (4)$$

$$B = \{(p43 - p33)dL/Ld\} + p33 \qquad (5)$$

All of the equations (1) through (5) are stored in the memory 5E.

Figure 7:
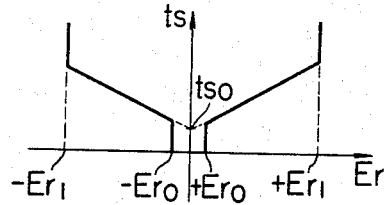
FIG. 7 is a graph showing the relation between the fundamental pulse duration $t_s$ of a control signal to be applied to the signal line 5k in FIG. 1 and the deviation Er.

The target rotational phase angle $p\theta o$ determined by Eq. (3) is compared with the actual rotational phase angle pθ determined by Eq. (1) and in the normal state, the arithmetic operation steps using the characteristics of FIG. 7 are performed in accordance with the result of the comparison to provide a command signal to the signal line 5k (FIG. 1).

That is, the steps are as follows.

Step 1:

Compute the deviation Er, $p\theta o - p\theta = Er$

Step 2:

Compare the absolute value of the deviation Er with the absolute values of the minimum reference deviation Ero and the maximum reference deviation Er1.

Step 3:

If the absolute value of the deviation Er is smaller than that of the minimum reference deviation Ero, make the voltage value of the command signal to zero.

Step 4:

If the absolute value of the deviation Er is larger than that of the minimum reference deviation Ero and smaller than that of the maximum reference deviation Er1, the central processing circuit 5B decides whether the deviation Er is of positive or negative sign. If the deviation Er is positive, the output is provided as one command signal to the signal line 5k1 in FIG. 3. If the deviation Er is negative, the output is applied as another command signal to the other signal line which, as previously stated, is not shown. Thus, the deviation Er is controlled to be minimized. At this time, the one or the other command signal has a rectangular pulse from of a duration proportional to the absolute value of the deviation Er pulse the minimum duration tso as shown in FIG. 7.

Step 5:

If the absolute value of the deviation Er is larger than that of the maximum reference deviation Er1, the command signal is continuously applied either to the signal line 5k1 or to the non-illustrated other signal line until the value of the deviation Er is corrected to the state of step 4.

Figure 8:
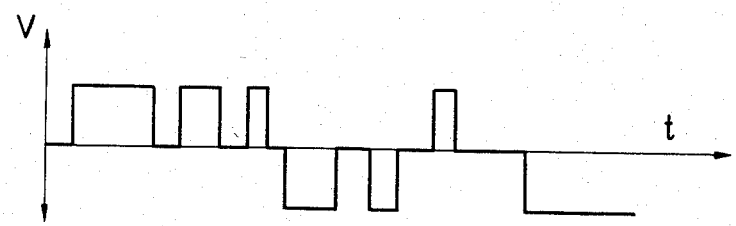
FIG. 8 is a waveform diagram of the control signal V appearing on the signal line 5k in FIG. 1 in accordance with the characteristic of FIG. 7.

The command signal characteristics as a result of the above arithmetic operations are shown in FIG. 8.

In FIG. 8, the positive going pulses are applied to the signal line 5k1 and the negative going pulses to the non-illustrated other signal line.

In FIG. 7, the ordinate ts represents the fundamental duration in which the step-like command signal is normally applied, and the abscissa Er represents the deviation. The characteristic curve on the right-hand side of the ts-axis represents the duration in which the command signal is applied to the signal line 5k1 in FIG. 3, which the characteristic curve on the left-hand side of the ts-axis denotes the duration in which the command signal is applied to the non-illustrated other signal line not shown, and tso represents the intersection between the ts-axis and the extensions of the slanted solid lines.

As described above, usually, the normal control is thus performed. However, in this case it happens that the sensitivity, or gain of the control system to the load to be controlled sometimes becomes too low or too high.

The case when the sensitivity of the control system is too low or too high for the control of, for example, the fuel injection timing regulator in the embodiment of the invention will be described below. The examples of the low control sensitivity are as follows:

(1) When the operation oil in the oil pressure pump 3 is at a considerably low temperature in a cold district or the like, the viscosity and specific gravity of the operation oil become high enough to dull the response of the oil pressure control system in the range of the pipe 3b-electromagnetic valve 5F-pipe 5n-injection timing regulator 2 (including oil pressure actuator).

In addition to the reduction of oil temperature, since the control system is of negative feedback type, the load condition to be set is indefinite at the start of the control when a start switch is turned on. As a result, the deviation Er between the intended rotational phase angle pθo and the actual rotational phase angle pθ is often very large at the initial condition. Thus, in this initial condition, it is necessary to quickly establish a properly controlled state and particularly when the oil temperature is low, the problem becomes serious.

(2) Since sudden stepping on the accelerator pedal of the diesel engine will abruptly change the state of the load in the fuel injection timing regulator, the control system must rapidly respond to the great change of the load condition.

Examples of too high control sensitivity are as follows.

(3) When the accelerator pedal is suddenly released, the torque of the injection timing regulator 2 becomes close to zero due to the rotational inertia of the load. At this time, when the oil pressure actuator operates the rotational phase angle, the relative control sensitivity to the load resistance (in this case, torque) is increased. Around this time, if control is made with the normal duration ts as shown in FIG. 7 in an attempt to correct the deviation Er, the resulting deviation takes the opposite sign, or the so-called overshooting takes place.

(4) When the too low sensitivity as in the case of (1) or (2) is automatically compensated for, it may occur that the compensation becomes excessive.

One embodiment of the invention for compensating for too low control sensitivity will be described with reference to FIGS. 9, 10 and 11.

Figure 9:
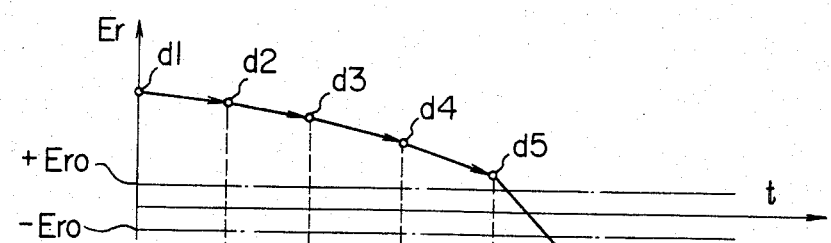
FIG. 9 shows a characteristic of change of the deviation Er with time in a sequence of control operations.
Figure 10:
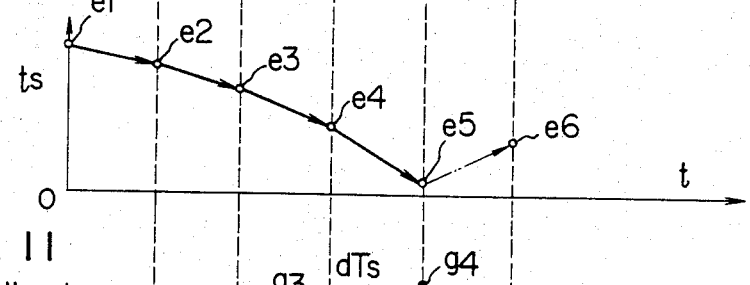
FIG. 10 shows a characteristic of the fundamental duration of a command signal changing in accordance with the graph of FIG. 9.
Figure 11:
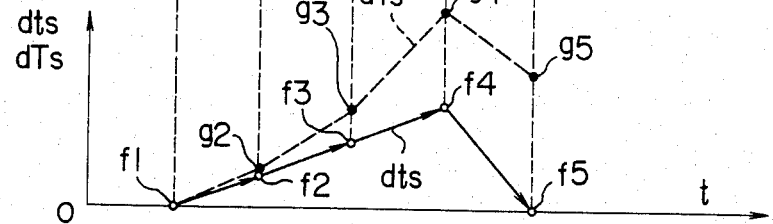
FIG. 11 shows a very small duration dts changing in accordance with the graph of FIG. 9, and a sum, dTs of the fundamental duration and the very small duration.

The ordinates in FIGS. 9, 10 and 11 represent the deviation Er, the fundamental duration of the command signal determined from FIG. 7, and the very short duration dts to be added to the duration ts and the duration dTs consisting of the sum of dts, respectively. The abscissaes t show time. In this case, the dull response of the control system is not directly detected but the arithmetic operation steps (1) to (5) are performed. When at the first deviation detection step the deviation Er is positioned at point d1 in FIG. 9. the central processing circuit 5B supplies the command signal of fundamental duration ts (corresponding to point e1 in FIG. 10) determined from FIG. 7 to the signal line 5k. However, since the response of the system is dull, the deviation Er at the second detection result (corresponding to point d2 in FIG. 9) is not yet smaller than the minimum reference deviation +Ero. Consequently, the central processing circuit 5B still supplies the command signal of the fundamental duration ts determined from the characteristics of FIG. 7 (corresponding to point e2 in FIG. 10). When at point d3 (in FIG. 9) of the third detection of deviation the deviation Er is not lower than +Ero, the very short durations dts corresponding to point f2 (FIG. 11) is stored in the first register of the memory 5E and the stored very short duration dts is added to the fundamental duration is determined from FIG. 7. A command signal of the sum duration is applied to the signal line 5k. The dts at this time is stored as dTs (corresponding to point g2 in FIG. 11) in the second register.

If the deviation Er is still not smaller than +Ero by the command of the sum duration, the contents of the first register is replaced by the increased value corresponding to point f3, and the contents dTs of the second register is added with the new contents of the first register. The resulting new sum dTs (corresponding to point g3) is added to the reference duration ts, and a commond signal of the sum duration is applied to the signal line 5k. Also, in the second register is stored the sum (corresponding to point g3) of the new contents of the first register and the previous contents dTs.

Similarly, when the deviation Er of the following detection result is not within the range from +Ero to −Ero as at point d5, the contents of the first register becomes a more increased value of f4. The sum duration (corresponding to g4) of point f4 and previous point g3 is added to the fundamental duration ts. A command signal of the resulting sum duration is applied to the signal line 5k in FIG. 1, and the contents of the second register are replaced by the value corresponding to point g4.

The very short duration values dts at f2, f3 and f4 (in FIG. 11) are increased in this order because a constant value (a value of the very short duration) is multiplied by the number of times of the successive deviation detections.

Although the load is controlled in one direction as described above, the same action can also be achieved by correcting the deviation from negative value to within the range of −Ero to +Ero.

Thus, when the control sensitivity of the control system in the first embodiment is low, the reduction of the oil temperature of the oil pressure control system, dull response of the control system, or sudden change of the load condition is not directly detected but the control system detects the deviation Er. In this case, if the deviation Er is not reduced to within the desired range from +Ero to −Ero or the sign of the deviation Er is not reversed (overshooting) even after a certain number of times of successive control of the deviation Er, the normal fundamental duration ts is successively added with very short duration dts in a repeated manner and the command signals of successively increased sum durations are applied to a line thereby to increase the deviation correction time within unit time, or to increase the control sensitivity until the deviation Er reaches a desired value.

In the first embodiment, the fundamental duration of the command signal is successively added with very short duration in a manner of integration, so that the control sensitivity is increased at each deviation detection, and when the deviation enters into a predetermined range of +Ero to −Ero, the dts value of the first register is made zero and the value dTs of the second register is kept at the previous value. Then, in the next time, the dTs is added to the fundamental duration of the first command for the following correction of the deviation in the same direction as the previous control direction, and at this condition, the sensitivity of the control system is generally considered to reach an appropriate value.

However, as described in the case (4), the command signal applied to the line 5k is successively added with very short time dts in a repeated manner, so that the amount of control by each command signal is increased, or the control sensitivity increases. It may occur, at the next deviation detection, the deviation overshoots as indicated by d6 in FIG. 9 to make the sensitivity of the control system too high. At this time, the sensitivity is corrected as follows.

That is, when the deviation d5 in FIG. 9 is detected, and the command signal added with very small duration of dTs=g4 is applied, the sensitivity controlled by the command signal becomes too high to cause the next deviation d6 overshoot. In this case, the next command signal is applied oppositely to the non-illustrated other signal line of the signal line 5k or to the signal line 5k1 thereof, and contrary to the above, the command signal corresponding to e6 and opposite to the previous one, as determined from FIG. 7, is applied to control the sensitivity. However, it may happen that the deviation is again shifted to the side of the original signal (above +Ero). In order to confine this deviation within the desired range (+Ero to −Ero), the very small duration proportional to the amount of the d6 overshoot is subtracted from the previous dTs (corresponding to g5) which is stored in the second register, and the new dTs is added to the fundamental duration ts determined from FIG. 7. Otherwise, it is possible that the ts added with g4 is taken as a fundamental value, and then the duration proportional to the amount of overshooting is subtracted from the fundamental value.

When further overshooting continues, the same subtraction of duration is made.

The value of dts is brought to f5, as shown in FIG. 11, by making the contents of the first register to zero when the deviation Er is confined within the desired range from +Ero to −Ero or the overshoot occurs.

Moreover, in the process (3) in which the accelerator pedal is released, when the sensitivity of the control system becomes relatively high, the same correction as in the overshooting is performed.

In other words, when the overshooting of the control is caused by the command signal for correcting deviation, the very small duration proportional to the amount of the overshooting is stored in the memory 5E, and when the next command signal is applied to correct the deviation Er in the same direction, the stored very small duration is subtracted from the fundamental duration ts, at normal time, determined from FIG. 7, to use the remainder as the duration of the command signal.

Thus, when the control sensitivity becomes relatively high with respect to the load resistance to be controlled, the duration of the next command signal is made short in proportion to the amount of the overshooting, and therefore, the amount that each command signal controls is reduced to attenuate the overshot condition, thereby preventing the hunting phenomenon of the control system.

As in the process (2), as a result of sudden stepping on the accelerator pedal, the shaft torque of the load in the fuel injection time regulator becomes maximum and the condition of the target to which the load is to be set (target rotational phase angle) is greatly changed, so that it is necessary for the control system to rapidly respond to this new condition. This is important particularly for controlling the fuel injection timing of the diesel engine in this invention, because if the response of the control is slow in the transient short period of time, the exhaust gas from the engine may possibly be deteriorated.

Therefore, the third embodiment for rapidly increasing the control sensitivity will be described with reference to FIG. 12.

Figure 12:
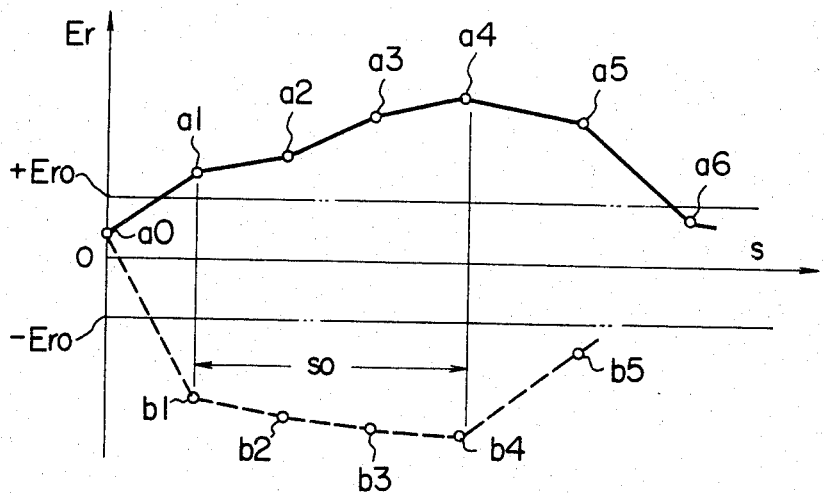
FIG. 12 is a graph of the diviation for the sudden change of the condition to the load.

FIG. 12 is a graph of the deviation Er with respect to the number s of times of the detection of deviation. The deviation Er at the first detection is within the desired range from $+$Ero to $-$Ero, and thus the command signal is not applied to the signal line 5m in FIG. 1.

However, thereafter, the condition to which the load is to be set may be changed as described above, and thus the deviation Er increases as a1, a2 . . . , a4, or decreases as b1, b2, . . . , b4. Here, for convenience of explanation, the deviation Er is assumed to change as a1, a2, . . . , a4.

When the deviation Er becomes out of the desired minimum reference deviation range, $+$Ero to $-$Ero, and is smaller than the maximum reference deviation Er1 (FIG. 7), the normal command signal according to the arithmetic operation step (4) is applied to the signal line 5k to correct the deviation, but since the intended or target rotational phase angle $p\theta o$ is rapidly and continuously changed as described above, the deviation at each detection increases as a2, a3 and a4.

In this case, the central processing circuit 5B, each time the deviation Er is detected, computes the difference between the deviations i.e., (a2−a1), (a3−a2) and (a4−a3). As a result, if each of the differences between the respective deviations are positive until a predetermined number of times of the detection of the deviations is reached, the values of the deviations Er are decided to increase divergently in one direction and, at the same time, the command signal based on the deviation a4 is continuously applied to the signal line 5k when the deviation a4 at this time is larger than Ero.

As a result, the deviation Er is rapidly modified as shown at a5 to a6 and then to enter within a desired range.

As is apparent from the above description, according to the digital control method of this invention, when the absolute values of the previously detected deviation and the nextly detected deviation following thereto are both larger than the absolute value of the predetermined minimum reference deviation Ero, and when the signs of the previously detected deviation and the nextly detected deviation are the same, the normal fundamental duration of the command signal to be applied is added with a predetermined duration for correcting the previously detected deviation to increase the sensitivity of the control system. On the contrary, when the signs of the previously detected deviation and the nextly detected deviation are different from each other, or when the control overshoots, a predetermined duration is subtracted from the fundamental duration of the command signal to be nextly applied in the same direction as the direction of the previous command signal applied to minimize the above said nextly detected deviation, and thus such command signal is advantageously applied to lower the sensitivity of the control system.

The sign of the deviation as in the above description is decided such that in the arithmetic operation step (1), the previously detected deviation and the next detected deviation are computed, and both the computed result are checked whether or not a carry is risen in each result of computation. Alternatively, in order to decide the signs, comparison is made as to whether the command signals for the previous deviation and the following deviation are applied to either the signal line 5k1 or the non-illustrated other signal line or to both the signal lines.

Thus, according to the digital control method of this invention, even if the relative control sensitivity to the load in the control system is rapidly or greatly changed by the fluctuation of the load condition in the control system or the state of the oil pressure control system due to the decrease of the external temperature, the sensitivity of the control system can be corrected to a value suitable for the control system by the processes as set forth above. Therefore, there are almost no overshooting and hunting phenomena occurring in the control, and the control can rapidly respond to the sudden change of the load to follow the target value.

Moreover, since the digital control method of this invention is capable of correcting the control sensitivity, the control system including an oil pressure control system, does not need such an arrangement as to keep the operating oil temperature of the oil pressure system constant, even when the control system is operated in a cold district, otherwise the reduction of the response is caused due to the decrease of the operating temperature in the oil pressure control system. Consequently, the present invention makes it unnecessary to provide an excessively large and expensive oil temperature regulator.

In addition, when the digital control method is used for the control of the fuel injection timing regulator in an engine, the sensitivity of the control is always corrected to a proper value in such a transient condition that the condition for use of the engine is suddenly changed. Thus, the exhaust gas from the car under driving is clean and the fuel cost can be kept at minimum.

What is claimed is:

1. A method of digital control by use of a train of command signal pulses, comprising the steps of:
   (a) intermittently detecting the successive values of a parameter;
   (b) determining the deviation of each detected value from a target value of the parameter;
   (c) comparing the absolute value of each deviation with the absolute value of a predetermined minimum reference deviation;
   (d) if the absolute value of a determined deviation is less than the absolute value of said minimum reference deviation, setting the next command signal pulse to zero;
   (e) if the absolute value of a determined deviation is greater than the absolute value of said minimum reference deviation, determining the sign of the determined deviation and settiing the duration of the next command signal pulse to a fundamental duration proportional to the determined deviation;
   (f) if the absolute values of a determined deviation and its next preceding determined deviation are both greater than the absolute value of said minimum reference deviation, determining the signs of the two successive deviations and, if both signs are the same, adding a given duration to the fundamental duration of the next command signal pulse or, if the signs are different, subtracting a predetermined duration from the fundamental duration; and
   (g) outputting the next command signal pulse with a time lapse after each detection of the value of the parameter.

2. The method of claim 1, wherein the predetermined duration to be subtracted from the fundamental duration is proportional to the determined deviation.

3. The method of claim 1, wherein the given duration to be added to the fundamental duration of the said next comman signal pulse comprises a constant added to the given duration added to the fundamental duration of the last preceding command signal pulse.

4. The method of claim 1, wherein the addition of the given duration to the fundamental duration of the next command signal pulse is continued until either the absolute value of the determined deviation is less than the absolute value of the minimum reference deviation or the sign of the determined deviation changes from the sign of the last previously determined deviation.

5. The method of any one of claims 1 to 4, wherein the parameter is the relative rotational phase angle between the input and the output shafts of the fuel injection timing regulator of an engine.

* * * * *